United States Patent
Alfano

(10) Patent No.: US 10,680,334 B2
(45) Date of Patent: Jun. 9, 2020

(54) RANDOM WALK MAGNETIC DIELECTRIC ANTENNA TO GENERATE BRILLOUIN AND SOMMERFELD PRECURSORS

(71) Applicant: Robert Alfano, New York, NY (US)

(72) Inventor: Robert Alfano, New York, NY (US)

(*) Notice: Subject to any disclaimer, the term of this patent is extended or adjusted under 35 U.S.C. 154(b) by 0 days.

(21) Appl. No.: 15/999,183

(22) Filed: Aug. 17, 2018

(65) Prior Publication Data
US 2019/0058528 A1    Feb. 21, 2019

Related U.S. Application Data

(60) Provisional application No. 62/546,917, filed on Aug. 17, 2017.

(51) Int. Cl.
*H01Q 7/08* (2006.01)
*H01Q 5/22* (2015.01)
*H04B 10/90* (2013.01)
*H01Q 9/16* (2006.01)

(52) U.S. Cl.
CPC ............... *H01Q 7/08* (2013.01); *H01Q 5/22* (2015.01); *H04B 10/90* (2013.01); *H01Q 9/16* (2013.01)

(58) Field of Classification Search
None
See application file for complete search history.

(56) References Cited

U.S. PATENT DOCUMENTS 5,495,259 A    2/1996    Lyasko
9,620,858 B2   4/2017    Alfano

OTHER PUBLICATIONS

H Wheeler, Proc IRE 35,1479 (1947).
L Brillouin, Wave Propagation and Group Velocity (Academic, New York, 1960).
P Pleshko and L. Palocz, "Experimental observation of Sommerfeld and Brillouin precursors in the microwave domain." Phys. Rev. Lett. 22, 1201 (1969).
R. Alfano, "Damping Effects on the Polariton and Plasmariton Dispersion Curves in n-GaAs" J. Opt. Soc. Am. 60. 1 (1970).

*Primary Examiner* — Robert Karacsony
(74) *Attorney, Agent, or Firm* — Myron Greenspan Lackenbach Siegel LLP

(57) ABSTRACT

A Random Walk Antenna (RWA) generates VLF, ULF, RF, MHz and GHz waves by dispersion of a driving signal through a ferriomagnetic ferrite nano and micron composite in compact ultra-small antenna. When oscillator frequency spans several resonances of ferrite magnetic dielectric media consisting of resonances from optical phonons and magnon high frequency and lower frequency are produced from Sommerfeld Polaritons Precursor (SP) and Brillouin Polariton Precursors (BP), respectively. The ferrite nano and micron size particle in antenna resultant electromagnetic waves from RWA contain Sommerfeld and Brillouin polariton precursors. High and low-frequency waves propagate with an algebraic attenuation making them ideal for deep use in highly conductive or highly attenuating media such as in seawater, buildings, underground and or free space on the Earth. Warfighters can use the RAW ferrite nano and micron size antenna system.

20 Claims, 5 Drawing Sheets

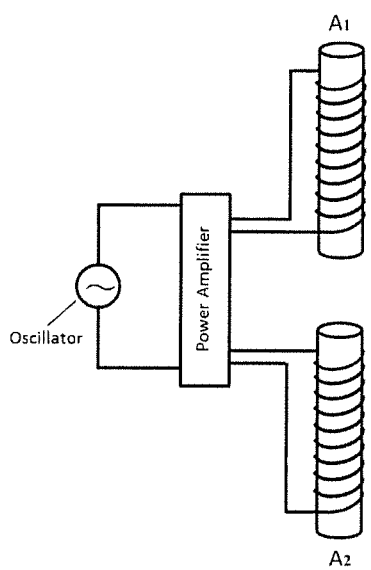 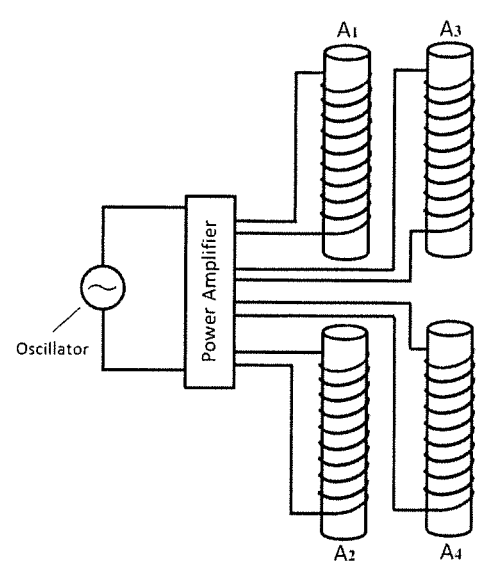
Fig. 2a                    Fig. 2b

RANDOM WALK MAGNETIC DIELECTRIC ANTENNA TO GENERATE BRILLOUIN AND SOMMERFELD PRECURSORS

BACKGROUND OF THE INVENTION

1. Field of the Invention

The invention generally relates generating E&M Precursors from compact electromagnetic wave antennas and, more specifically, to Random walk magnetic dielectric antenna consisting of nm and urn size particles for VLF, RF MHz and GHz regime for communications, detecting objects and imaging objects.

2. Description of the Prior Art

Development of compact random walk antenna (RWA) is an important advance since underwater and underground two-way RF communication, detecting objects and imaging objects, is currently is not available. The RWA is on order of <1 m in size for VLF, RF, Mhz, and GHz uses In particular, for VLF (0.3 KHz to 30 KHz) and LF (30 KHz to 300 Kz) up to MHz, the conventional size of the antenna for VLF is 100 Km. GHz can be made small for cell phones. Optical RWA involve the excitons quantum particle and bulk semicoductors such as GaAs, II_V and II-VI media. VLF and radio waves can diffract about large obstacles and can propagate as ground waves following the earth's curvature. They can reflect off the ionosphere. VLF has low attenuation propagating 1000 km with not much loss. They can propagate in water to a distance of 40 m and deep into the earth. They can be used to detect objects by reflection for VLF radar under water or underground tunnels. The RWA can be used on ships, planes, drones, and worn by warfighters and firemen. Also, the antenna can be used in cell phones at GHz. Underwater wireless communication links have almost exclusively been implemented using acoustic systems. Optical links have proved impractical for many applications. Although underwater radio links were experimentally evaluated in the pioneering days of radio (1), they did not meet the requirements of the time. An ideal size for antenna for oscillator is half wavelength. Compact antenna on order <half wavelength have been described for 70 years [1]. The RWA provides a fundamental shift to this paradigm (2) over the conventional art. Because the RWA can produce low-frequency waves with low attenuation and adequate bandwidth for multichannel communication, the time is now ripe for re-evaluating the role of electromagnetic signals in the underwater, free space and underground environment. The teaching here for compact RWA provides signal from E&M waves in RF region input into dispersion in nano or Micron size particles of ferrite dielectric materials from magnons, vibrational optical phonon modes and/or excitons can generate Sommerfeld and Brillouin Precursors as the signal for applications describe herein depending on the carrier frequency $\omega_c$ and resonance frequency of quasi particle $\omega_0$. There are different Polaritons from coupling with E&M photons with optical phonons, excitons and magnons.

The antenna is an integral element of E&M and optical communication systems, without which the output will be non-existent-just noise. To transmit a signal of a specific wavelength, $\lambda$, the optimal conventional design allows the oscillating current to form a standing wave along the length of the antenna. This means that the physical length of the antenna defines at what frequency the radio transmission will be. For VLF conventional antenna the size is 10-100 kms. The subject invention involves new applications using RWA for VLF, RF, MHz, GHz and optical region regime (2).

The ideal antenna length is half a wavelength of the oscillator. This common antenna design is known as the half-wave dipole, the total length of which is half the length of the transmission wavelength, or $\lambda/2$. It has been over 70 years since the first report of the small antenna by Wheeler [1], since then thousands of designs have been reported. Wheeler defines a small antenna as one where the maximum dimension L is less than the radian length $l=\lambda/2\pi$ (inverse of propagation constant k):

$$L<1=\lambda/2\pi. \quad (1)$$

Here, we design an ultra-small RWA with ferrimagnetic nanoparticles in a cylindrical matrix to get:

$$L<<1=\lambda/2\pi. \quad (2)$$

Typical length of a low-frequency (LF) conventional antenna is >1 km, while the length of the RWA can be as small as 6 inches and usually <1 meter [2].

Sea water is salty and therefore a good conductor. Consequently, it attenuates electromagnetic waves. This attenuation increases as the frequency increases. Conversely, low frequency electromagnetic waves are able to propagate an appreciable distance before becoming undetectable. Therefore, the radio wave under sea water communication is restricted to very low frequency waves with very small bandwidth and consequently very low data rates. Extremely Low Frequency (ELF) and very Low frequency VLF submarine communications systems have been deployed by the United States, Russia and India to radiate long distance. For example VLF antenna systems are a 24 KHz for Culter Maine with 1.8 Mega watts; 24.6 Khz from Seattle Wash. at 192 kW; and 24.8 KHz from Arlinton, Wash.: these are successful applications of submaine/subsea electromagnetic communications. Amateurs antenna power is from 1 uW to 100 uW. Operating in the ELF band allowed signals to be transmitted around the earth and through the earth and sea, but at a transmission rate of only a few characters per minute and require massive antenna installations. These systems allowed for a one way 'bell ring' that will signal a submarine to come to the surface for terrestrial radio communication at conventional bandwidth. At the time of greatest interest in low-frequency RF communication, terrestrial radio were already delivering Morse code or full bandwidth analogue voice communications over long distances, and research was aimed at delivering comparable service in the underwater environment. These services were found to be impractical in the VLF band, conventional wisdom developed that electromagnetic signals could not be used underwater. The RWA overturns both of these limitations. Conventional antennas were many kilometers in length with extremely limited bandwidth. Some are mile long. The RWA may be less or equal to 1 meter long, and has bandwidth about 300 Hz from scattering off the nano and micron size particle as taught in [2].

In the RWA there are many path lengths traveled for E&M waves to satisfy the half wavelength condition for efficient power conversion about $>10^{-8}$. For input power in watts one obtains output powers in $\mu$m to pW.

SUMMARY OF THE INVENTION

The teachings of RWA, unlike conventional antenna, uses dielectric-magnetic particles of nanometer to micrometer size in an active core and produces Brillouin precursor (BP) and Sommerfeld Precursor (SP) waves by dispersion of the unit step sine wave pulse [4]. At the same time the length of RWA is significantly less (~1 m instead of 25 kilometers) for low frequency (2 kHz to 75 kHz) applications. The algebraic attenuation of the BP makes the potential communication distance of the RWA ~1 km in seawater and ~10 km underground. For 30 GHz the size is small on the order of 1 mm and for 30 MHz is 1 cm. [2]. Applications can be under water communication, underground detection, imaging objects by refection using VLF and RF up to MHz [2].

BRIEF DESCRIPTION OF THE FIGURES

The above and other aspects, features and advantages of the present invention will be more apparent from the following description when taken in conjunction with the accompanying drawings, in which:

FIGS. 2a and 2b illustrate 2 and 4 dipole arrays, respectively;

DETAILED DESCRIPTION

The RWA technology, which enables the generation of electromagnetic energy in a very small footprint, can provide new RF scenarios like underwater and through the ground communication and imaging, detecting mines; thus opening new business opportunities previously not viable with present antenna modalities. A new recent patent was granted on random walk antenna to the PI: Robert Alfano U.S. Pat. No. 9,620,858 B2 in 2017 for MHz, GHz and KHz [2] and small antenna units [3].

VLF radio waves can be exist after traveling ~700 meters in seawater (using conventional antenna VLF radio waves can penetrate seawater to a depth of only up to 40 meters). The same or better can be achieved using RWA due the SP and BP Waves.

The length of the tested RWA module is 27 inches <1 meter which is four orders of magnitude smaller than conventional antenna which is ¼λ=c/4f or 25 km. [3]

Figure 1:
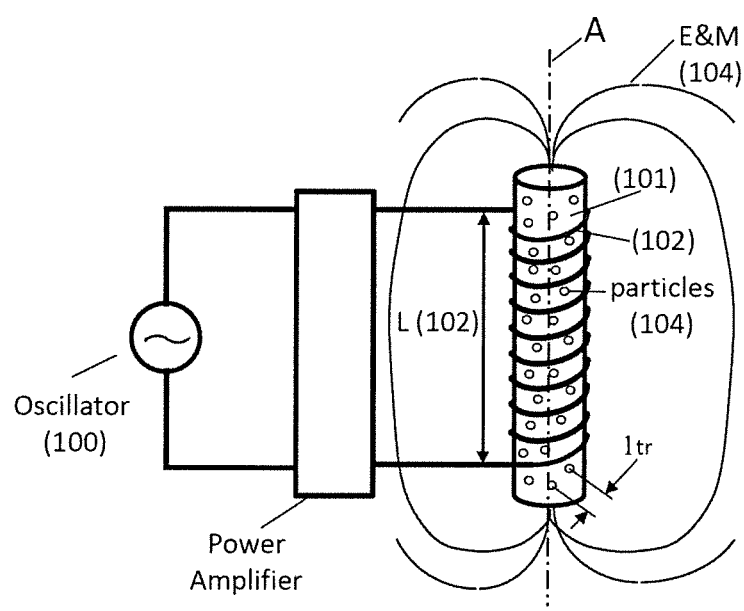
FIG. 1 shows an antenna in accordance with the invention.

FIG. 1 shows a schematic of a compact antenna 10 in accordance to the invention. The antenna 10 has an elongated polymer core (101) having a physical length L (105) exhibiting a dipole λ/2 E & M radiation (104) pattern from particles (103) in the polymer core (101) when oscillator (100) applies a signal frequency of having a wavelength λ across the wire or coil (102). FIG. 1 also shows a schematic of an equivalent half wavelength antenna (106).

The elongate core 101 is generally cylindrical and shown as a uniform cylinder having a round cross-section and in the form of a tube or rod defining an axis A. The core length L is selected to be within the range RF/HF and formed of any suitable material such as a polymer, liquid, glass and ceramic. The dimension L and the nature, number and concentration of particles is selected to accommodate frequencies from 1 KHzx to 900 MHz by selecting particle sizes within the range of 1 mm to µm size with a nominal size of 100 nm in size. To accommodate a wider range of frequencies a mixture of particles of nm and µm sizes may be used.

Any particles may be used that have high values of µ and ε. Thus, the following materials are examples of particle materials that can be used: barium-ferrite, strontium-ferrite, lanthanum strontium ferrite, copper-iron oxide, lithium iron (III) oxide, nickel zinc iron oxide, copper zinc iron oxide.

Figure 1A:
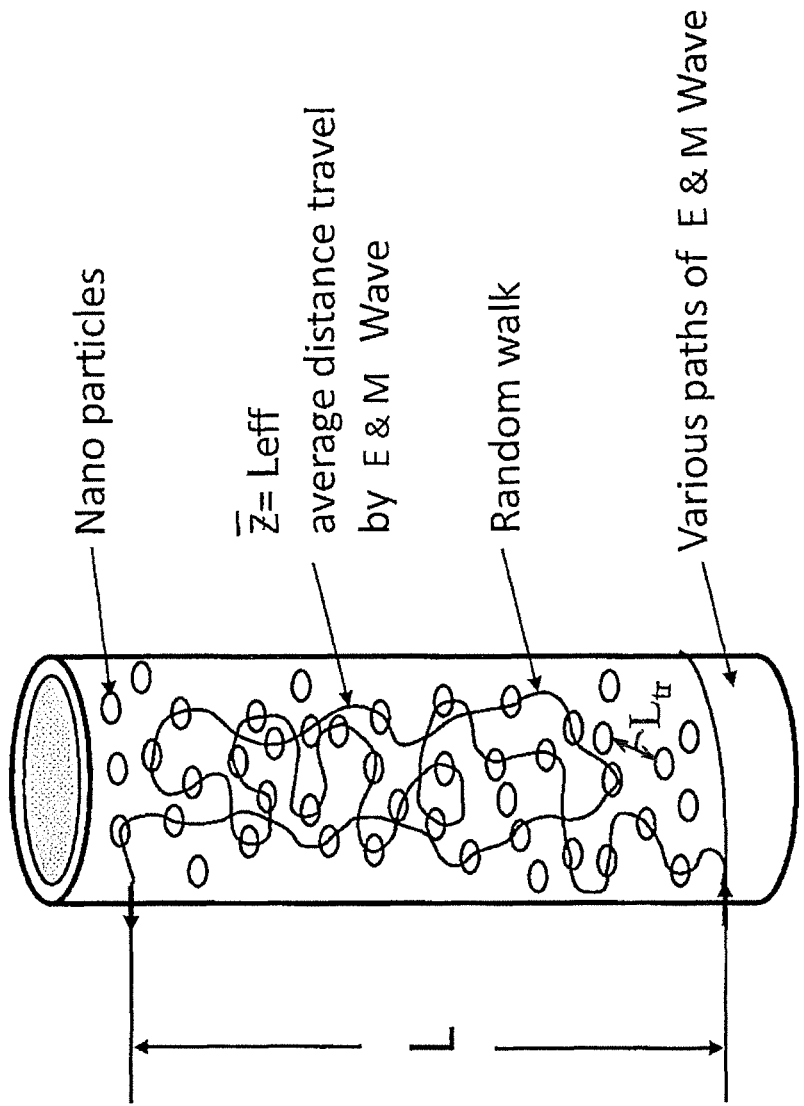
FIG. 1a is a diagrammatic representation of a compact antenna of the type shown in FIG. 1 showing the random walks of an electromagnetic wave as it encounters nano particles.

The random walk scattering and hopping of E & M radiation (107) is shown in FIG. 1A, where hopping is defined by $l_{tr}$ in the random particle antenna 10.

The transport mean free path defined as the distance in which a photon is fully randomized (forgets its original direction of motion) after numerous scattering events.

FIGS. 2a and 2b illustrate two and four array of dipole antennas ($A_1$, $A_2$, $A_3$ and $A_4$ for source and detection of objects by reflection.

Physical Mechanism of RWA

The underlying physics behind the RWA has to do with the generation of precursor waves from polaritons from ω vs k dispersion of an electromagnetic input signal with multiple resonances from the coupling of optical phonons with dielectrics, plasmons, and magnons residing in the magnetic nano- micron materials and excitons in optical regime. One or more of these quasi particles (harmonic oscillators) can generate the output from the array on nm and µm particles in host media. The oscillator frequency spans cover the many long frequency resonances of material. The scattering by µm and/or nm particles in core gives ideal condition for ½ wavelength from $L_{eff}=L^2/2L_{tr}=\mu/2$ wavelength [2] where $L_{tr}$ gives the transport scattering length. Alfano [2] teaches the size of RWA from ransom walk scattering. The new The random walk magnetic dielectric dipole antenna as described has physical length of the active elongated core L and scattering from µm and/or nm particles in said core provides ½ wavelength from $L_{eff}=L^2/2L=\mu/2$, wavelength where $L_{tr}$ equals the transport scattering length and $L_{eff}$ is the effective distance traveled by an electromagnetic wave antenna by random walk.

The bases of the teaching here underling the RWA is the generated waves from RWA antenna are precursors and polaritons. Precursors were originally predicted in 1914 by Sommerfeld and Brillouin [4], and are formed because of differences in the velocity of different frequencies through a dispersing Lorentz dielectric media. Most theoretical approaches have considered dispersion in a Lorentz dipole media. FIG. 1 shows schematically the propagation of electromagnetic beam in a Lorentz water-like medium of harmonic oscillators with resonance frequencies ω0 at frequencies below and above carrier frequency we. A unit step wave at we splits into two precursors: a high frequency ($\omega_s>\omega_0$) called Sommerfeld precursor (SP) and low frequency ($\omega_B<\omega_0$) called Brillouin precursor (BP). According to Brillouin in 1914, the output pulse travels at c which proceeds undisturbed due to finite response of Lorentz medium dipole [4, 5]. The SP is Bessel J1 and BP is Airy function (J ⅓) in time. The bandwidth of the signal needs to cover optical phonons and magnon to satisfy the BP and SP. Excitons in semiconductor and dielectric media can produce exciton polaritons where the SP for high frequency and BP for low frequency of the exciton frequency set at exciton $\omega_0 = E_{ex}/h$ where $E_{ex}$ is exciton energy for Exciton levels states at n=1, 2, The ferrite matrix of the RWA differs from the dipole media in that dispersion is dependent on the local magnetic field as well as the electronic characteristics of the material. The coupling of an incident photon and quasi-particles within the matrix, such as photons, magnons, and excitons generates the output signal. The total dispersion of the dielectric magnetic media can be written as the sum of dispersion due to the quasi-particle components following [6]:

$$\epsilon = \epsilon_\infty - \frac{4\pi}{i\omega}o' - \frac{(\epsilon_0 - \epsilon_\infty)\omega_{TO}^2}{\omega^2 - \omega_{TO}^2 + i\gamma} - \left[\frac{4\pi\omega_s}{\omega + \omega_0}\right], \quad (3)$$

where the first term $\epsilon_\infty$ is the high frequency dispersion of the electron, the second term is due to the plasmon, the third term is due to the lattice electrons, and the fourth term due to the magnon. The coupling of the E&M photons with quasi particle produce polaritons [6], which in turn produce the SP and BP wave from the antenna.

A random walk magnetic dielectric dipole antenna as described comprises magnetic media in said ferrite matrix with magnetic dispersion properties and magnons comprises at least one of the following: Yittrium iron garnet (YIG), Terbium iron garnet (TRIG), barium ferrite, strontium ferrite, lanthium ferrite, copper, iron Oxides, Cobalt iron and Magnetite.

A random walk magnetic dielectric dipole antenna as described includes a ferrite matrix is selected to provide spacing and concentration of active particle mixture to generate desired output waveforms.

Previous theoretical and experimental work has focused largely on non-magnetic dielectric media, and ignored the magnetic term M. We introduce M from magnons in RWA.

We teach to explore the critical role of the magnetic M dispersion in the formation of BP and SP in the RF range. Because of the random character of the matrix at a molecular level, multiple polaritons are generated. FIG. 2 shows schematically how the dispersion of matrix is related to the presence of multiple coupling events.

Figure 3:
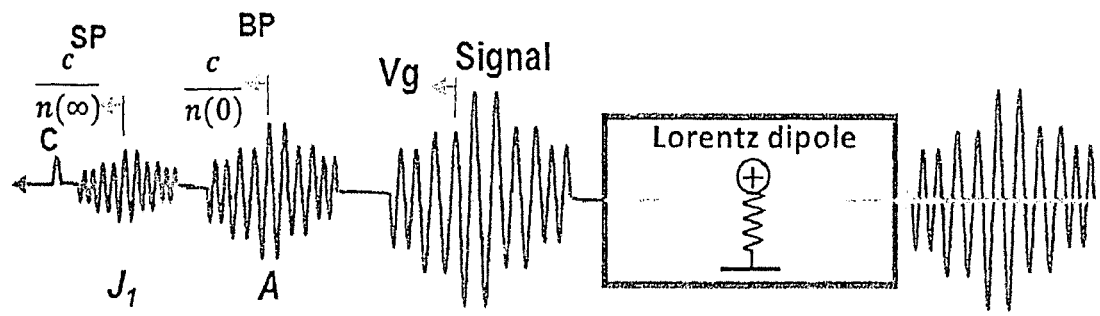
FIG. 3 shows a unit step input at $\omega_c$ split up into c, SP, and BP in RWA from resonance of dipole of and optical phonons and magnons.
Figure 4:
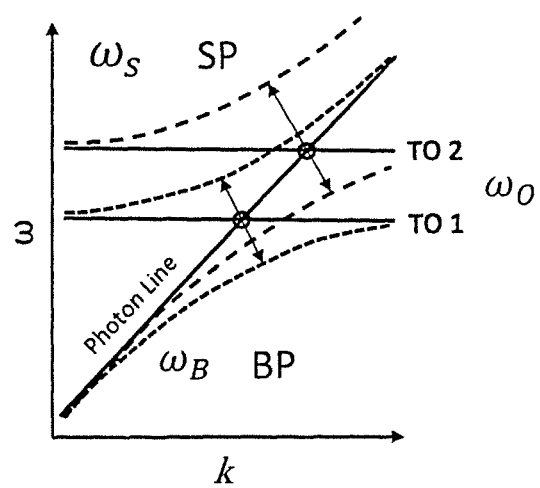
FIG. 4 is a dispersion curve for a multi resonance media. The optical phonon line is shown plotted as a function of k and W points of resonance are at the intersection of the optical photon line (blue dots) with transverse phonons and magnons (labelled TO1, TO2, M) to produce polaritons for generation of SP and BP forerunners. M is missing. The schematic shows n=2 multiple resonances, however, it is possible that many other resonances may exist within a nanocomposite matrix.
Figure 5:
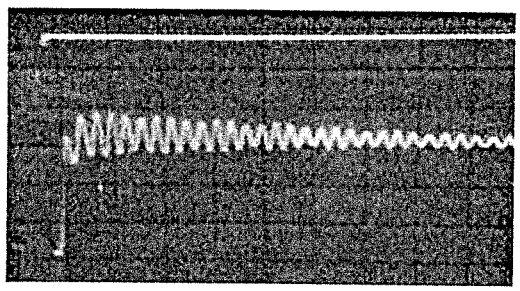
FIGS. 5 and 6 illustrate signal waveforms detected is a superposition of Bessel-like damped sine waves. The characteristic of precursors is the algebraic distance dependence on $1/z^n$ and Bessel profile where the n=½-2.
Figure 6:
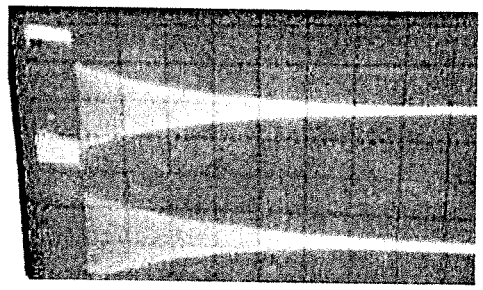

The experimentally measured signal waveform appears to be a slowly oscillating damped sine wave, which suggests that it is the sum of several signal components, shown in FIG. 3 of Bessel and Airy functions indicating multi-resonances from optical phonons and magnetics spin resonances.

The field input to material $E = E_0 u(t) \cos \omega_c t$. The frequency parts of output signal occurs at times $$t_{SP} = \frac{zn(\infty)}{c}$$

for high frequency followed by low frequency $$t_{BP} = \frac{zn(0)}{c}$$

before the main signal appears at $$t_g = \frac{z}{V_g} = \frac{zn(g)}{c}.$$

The output signal field amplitude should be:

$$E_T(z,\omega) = E_0\delta + E_{SP} + E_{BP}E_{signal}. \quad (4)$$

SP precursor travel at the speed $$V_{SP} = \frac{c}{n(\infty)},$$

BP precursor at $$V_{BP} = \frac{c}{n(0)}$$

and main signal at $$V_{sg} = \frac{c}{n_g(\omega_c)}$$

whereas the respective fields are:

$$E_{SP} \sim J_1 \sim \frac{1}{z^{1/2}} \text{ and } E_{BP} \sim \text{Airy} \sim \frac{1}{z^{1/2}} \quad (5)$$

The precursors vary as $$E \sim \frac{1}{z^{1/2}}.$$

RWA can revolutionize radio communication underwater and underground. It can provide reliable connection for miners underground, communication in tunnels and deep canyons, detection of tunnels and other constructions underground, will allow to estimate the size and recoverability of oil, gas and other resources. It will provide communication with submarines in depths up to 1 km, communication with and operation of underwater drones, communication with divers as deep as 100 meters. Past small antenna [1,3]

While the invention has been shown and described with reference to certain embodiments thereof, it will be understood by those skilled in the art that various changes in form and detail may be made therein without departing from the spirit and scope of the invention as defined by the appended claims and their equivalents.

REFERENCES

1. H Wheeler, Proc IRE 35,1479 (1947)
2. R. Alfano, U.S. Pat. No. 9,620,858 B2 (2017)
3. G. Lyasko, U.S. Pat. No. 5,495,259 (1996)
4. L. Brillouin, *Wave Propagation and Group Velocity* (Academic, New York, 1960)
5. P. Pleshko and L. Palocz, "Experimental observation of Sommerfeld and Brillouin precursors in the microwave domain." Phys. Rev. Lett. 22, 1201 (1969).

6. R. Alfano, "Damping Effects on the Polariton and Plasmariton Dispersion Curves in n-GaAs" J. Opt. Soc. Am. 60, 1 (1970)

What is claimed:

1. A random walk magnetic dielectric dipole antenna comprising a host material in the nature of an active elongated core and forming a ferrite matrix of dielectric-magnetic particles of nanometer to micrometer size; signal generating means for generating an electromagnetic field through said core, said ferrite matrix including quasi-particles in a magnetic dielectric media that produces scattering in said core and magnetic dispersions, coupling of an incident photon and quasi- particles within said ferrite matrix generating an output signal that results from the sum of dispersions due to high frequency dispersion of at least electrons, plasmons, lattice electrons, magnons and excitons and coupling of photons with said quasi- particles within said ferrite matrix producing polaritons that, in turn, produce Sommerfeld precursors (SP) and Brillouin precursors (BP) from resonances within said core and produce an output signal that includes a primary output that corresponds to an input signal and said SP and BP precursor signals, where the precursors generated depend on carrier $\omega c$ and its bandwidth above for SP or below for BP the resonance frequency $\omega o$ of the active quasi particle resonance $\omega_0$ in the antenna media.

2. A random walk magnetic dielectric dipole antenna as described in claim 1, wherein said magnetic media in said ferrite matrix with magnetic dispersion properties and magnons comprises at least one of the following: Yittrium iron garnet (YIG), Terbium iron garnet (TBIG), barium ferrite, strontium ferrite, lanthium ferrite, copper, iron Oxides, Cobalt iron and Magnetite.

3. A random walk magnetic dielectric dipole antenna as described in claim 1, wherein said host material is surrounded by a copper wire coupled to an oscillator of said signal generating means for polaritron dispersion and SP and BP generation.

4. A random walk magnetic dielectric dipole antenna as described in claim 1, wherein said signal generating means generates wave functions at input to said core to generate custom output waveforms for specific applications.

5. A random walk magnetic dielectric dipole antenna as described in claim 1, wherein said signal generating means comprises a source oscillator for generating at least one of square and pulse signals at $\omega_c$.

6. A random walk magnetic dielectric dipole antenna as described in claim 1, further comprising magnetic field generating means for generating and applying an external magnetic field to alter dispersions within said core to change modes for generating output signals.

7. A random walk magnetic dielectric dipole antenna as described in claim 1, further comprising an array of dipole antennas for source and detection of objects by reflection.

8. A random walk magnetic dielectric dipole antenna as described in claim 1, wherein said ferrite matrix is selected to provide spacing and concentration of active particle mixture to generate desired output waveforms.

9. A random walk magnetic dielectric dipole antenna as described in claim 1, wherein the physical length of said active elongated core is less than 1 meter for generating radio waves in the very low frequency (VLF) and low frequency (LF) ranges, Where RF, MHz, GHz and optical ranges depends on both the size of the particle in the range of nm to μm and scattering lengths.

10. A random walk magnetic dielectric dipole antenna as described in claim 1, wherein the physical length of said active elongated core is L and scattering from μm and/or nm size particles in said core provides ½ wavelength from $L_{eff}=L^2/2L_{tr}=\lambda/2$, wavelength where $L_{tr}$ equals the transport scattering length and $L_{eff}$ is the effective distance traveled by an electromagnetic wave in an antenna by random walk.

11. A random walk magnetic dielectric dipole antenna as described in claim 1, wherein said active elongated core comprises a Lorentz dipole media to create the precursors.

12. A random walk magnetic dielectric dipole antenna as described in claim 1, wherein said quasi-particles within ferrite matrix are selected to create dispersion dependent on local magnetic field as well as electronic characteristics of said ferrite matrix.

13. A random walk magnetic dielectric dipole antenna as described in claim 1, wherein said magnetic media in said ferrite matrix with magnetic dispersion properties and magnons comprises at least one of the following: polymer, liquid, glass and ceramic.

14. A random walk magnetic dielectric dipole antenna as described in claim 13, wherein said host material is surrounded by a copper wire coupled to an oscillator and amplifier for polaritron dispersion and SP and BP generation.

15. A random walk magnetic dielectric dipole antenna as described in claim 1, wherein said signal generating means comprises magnetic field generating means for generating and applying an external magnetic field to alter dispersions within said core to change modes for generating output signals.

16. A random walk magnetic dielectric dipole antenna as described in claim 1, wherein the physical length of said active elongated core is less than 1 meter for generating radio waves in the very low frequency (VLF) and low frequency (LF) ranges.

17. A random walk magnetic dielectric dipole antenna as described in claim 1, wherein the physical length of said active elongated core is L and scattering from μm and/or nm size particles in said core provides ½ wavelength from $L_{eff}=L^2/2L_{tr}=\lambda/2$, wavelength where $L_{tr}$ equals the transport scattering length and $L_{eff}$ is the effective distance traveled by an electromagnetic wave in an antenna by random walk.

18. A random walk magnetic dielectric dipole antenna as described in claim 1, wherein said active elongated core comprises a Lorentz dipole media.

19. A random walk magnetic dielexctric dipole antenna as described in claim 1, wherein said precursors SP and BP are within the frequency range from THz to 600 THz from exciton polaritons in the range IR, NIR, visible to 200 nm.

20. A method of generating RF signals in the VLF and LF radio frequency ranges comprising the steps of forming an active elongated core of a ferrite matrix of dielectric-magnetic particles of nanometer to micrometer size, said ferrite matrix including quasi-particles in a magnetic dielectric media that produces scattering in said core and magnetic dispersions: activating quasi-particles within said ferrite matrix to generate an output signal that results from the sum of dispersions due to high frequency dispersion of at least electrons, plasmons, lattice electrons, magnons and excitons and coupling of photons with said quasi-particles within said ferrite matrix to produce polaritons that, in turn, produce Sommerfeld precursors (SP) and Brillouin precursors (BP) from resonances within said core and produce an output signal that includes a primary output that corresponds to an input signal and said SP and BP precursor signals.

* * * * *